(12) United States Patent
Pfeiffer et al.

(10) Patent No.: US 6,963,443 B2
(45) Date of Patent: Nov. 8, 2005

(54) OPTICAL PARAMETRIC OSCILLATOR AND METHOD OF CONSTRUCTING SAME

(76) Inventors: Andrew Pfeiffer, 59 Garnet Avenue, Blackwood, South Australia 5051 (AU); Jeffrey Shayne Brown, 48 Tiller Drive, Seaford, South Australia 5169 (AU); Jacob Mackenzie, 4 Aland Pl, Fadden, ACT 2904 (AU); Jeffrey Wayne Ruch, 30 The Dress Circle, Athelstone, South Australia 5076 (AU)

( * ) Notice: Subject to any disclaimer, the term of this patent is extended or adjusted under 35 U.S.C. 154(b) by 94 days.

(21) Appl. No.: 10/357,936

(22) Filed: Feb. 3, 2003

(65) Prior Publication Data

US 2004/0021930 A1 Feb. 5, 2004

(30) Foreign Application Priority Data

Aug. 4, 2000 (AU) .................................. PQ9220
Aug. 3, 2001 (AU) .................... PCT/AU01/00947

(51) Int. Cl.[7] ............................................. G02F 1/39
(52) U.S. Cl. ....................................................... 359/330
(58) Field of Search ................................ 359/326–332

(56) References Cited

U.S. PATENT DOCUMENTS

| | | | |
|---|---|---|---|
| 5,592,326 A | * | 1/1997 | Taira .......................... 359/326 |
| 5,651,023 A | | 7/1997 | MacKinnon |
| 5,796,766 A | | 8/1998 | Hargis et al. |
| 5,838,713 A | | 11/1998 | Shimoji |
| 2002/0078710 A1 | * | 6/2002 | Takeuchi et al. ............... 65/31 |

FOREIGN PATENT DOCUMENTS

WO        WO0071342 A1    11/2000

* cited by examiner

*Primary Examiner*—John D. Lee
(74) *Attorney, Agent, or Firm*—Francis Law Group

(57) ABSTRACT

The present invention relates to an optical parametric oscillator including a non-linear optical crystal and two glass substrates surface contacted to the opposite ends of said crystal. The substrates include mirrors on their outer surfaces so that the combination of the mirrors, substrates and the crystal functions as the parametric oscillator. The invention also relates to the method of producing such an oscillator that overcomes the problems of surface contact bonding and laser damage threshold by use of an alkaline polishing compounds on the crystal ends.

22 Claims, 3 Drawing Sheets

OPTICAL PARAMETRIC OSCILLATOR AND METHOD OF CONSTRUCTING SAME

FIELD OF THE INVENTION

The present invention relates broadly to an optical parametric oscillator (OPO) and to a method of constructing such an optical parametric oscillator.

BACKGROUND OF THE INVENTION

An OPO generally consists of a material that has a significant non-linear coefficient of refractive index placed in a resonant optical cavity formed by two opposing mirrors. Laser radiation from a "pump" source enters the resonant cavity and some of it is converted to coherent laser radiation at a shifted wavelength for which the cavity is optically resonant and for which phase matching conditions prevail in the OPO material. This is accompanied by another laser beam, called the "idler" having a wavelength determined by the conservation of energy between the energy of a pump photon and the sum of energies of the shifted and idler photons. Non-linear materials of Potassium Titanyl Phosphate (KTP) and Potassium Titanyl Arsenate (KTA) are established to be useful OPO materials.

Shifting of the wavelength of a laser beam can, for example, be desired to provide "eye safe" laser beams. Typically, the wavelength range between 1.5 $\mu$m and 1.8 $\mu$m is referred to as an eye safe range.

Presently, there are two alternative construction designs for OPOs available, namely a discrete construction design and a monolithic design.

It is known to use a discrete construction design where the mirrors are coatings on discrete optical glass components spatially removed from the OPO. These coatings generally have good adhesion properties on optical glass.

However, this design requires alignment conditions to be maintained between the glass components, i.e. the carriers for the mirrors, and the crystal of the OPO. This design has thus disadvantages relating to costs, size, weight and the difficulty of achieving and maintaining the alignment of the separate components over the operational range of environmental conditions. Further, since the OPO crystal and the mirrors are spatially separated, there may occur unwanted Fresnel reflections from the uncoated surfaces of the crystal, hence the alignment of the crystal has to take this into consideration.

The problems of the alignment of the crystal to the mirrors are avoided in the monolithic design, where coatings are applied directly to the faces of the crystal of the OPO that then function as the mirrors for the OPO. However, the monolithic design has some disadvantages. One of these is poor adhesion of the coatings on the crystal over the required ranges of environmental conditions and the associated inconsistency of laser damage threshold of the coatings.

It will be apparent from the above that there is a need for an alternative OPO construction, which, in at least preferred embodiments, can avoid or minimise one or more of the above disadvantages, or at least provide the public with a useful alternative.

SUMMARY OF THE INVENTION

In accordance with a first aspect of the present invention there is provided an optical parametric oscillator including:
at least one non-linear optical crystal;
a first optical glass substrate having an inner and an outer surface;
a first mirror arranged on said outer surface of said first optical glass substrate, said first optical glass substrate surface contact bonded to said crystal across at least a portion of said first substrate inner surface.

Advantageously said oscillator further includes a second optical glass substrate having an inner and an outer surface; a second mirror arranged on said outer surface of said second optical glass substrate, said second optical glass substrate-surface contact bonded to said crystal across at least a portion of said second substrate inner surface.

Preferably said crystal includes two outer substantially parallel faces to which are surface contact bonded the first and second substrates respectively. Preferably said crystal is a non-linear coefficient of refractive index type crystal.

Preferably said crystal is chosen from the group including but not limited to Potassium Titanyl Phosphate (KTP) and Potassium Titanyl Arsenate (KTA).

Preferably said optical glass substrate is high refractive index glass.

Preferably said optical glass substrate is SF 11 glass.

Preferably at least one of said optical glass substrates includes an internal polarising film.

Preferably at least one of said optical glass substrates is a reflection prism.

In a further form of the invention there is proposed a method of constructing an optical parametric oscillator (OPO), the method including the steps of:
providing a mirror on an outside surface of each of at least two optical glass substrates or crystal windows, and
optically contacting one of the windows onto each of end faces of an OPO crystal.

In preference the step of optically contacting includes the step of removing contamination from contacting surfaces of the window and the crystal respectively.

In preference removing of the contamination includes polishing the contacting surfaces in a manner such as to not destroy the surface and quality.

In preference the polishing includes polishing lightly using a polishing compound and a pad, and wherein the removing of the contamination further includes cleaning the contacting surfaces to remove any remaining polishing compound. The cleaning may be effected utilising isopropyl alcohol or acetone.

In preference removing of the contamination includes clearing away surface layers of the respective contacting surfaces.

In preference the step of polishing includes using a polishing compound.

In preference the polish used in polishing the crystal end faces is an alkaline type polishing compound.

In preference the alkaline polishing compound is an alkaline colloidal silica polish.

In preference the polishing compound used in polishing the windows' contacting surfaces is a neutral glass polish.

In a yet further form of the invention there is proposed an OPO manufactured in accordance with a method as defined above.

In preference one of the mirrors is arranged, in use, to function as an output mirror of a pump laser for the OPO.

In preference at least one of the windows' outer surface is non parallel or non planar, whereby the window is arranged, in use, to function as further optical element.

In preference at least one window is in the form of a reflection prism, wherein one of the side faces of the prism is optically contacted to the crystal and the mirror is provided on the other side face of the prism.

Preferably said OPO is arranged, in use, in a manner such that a pumping beam is oblique with respect to an optical axis of the crystal.

Preferably said OPO is rotatable with respect to an optical axis of the pumping beam.

Preferred forms of the invention will now be described with reference to the accompanying drawings.

BRIEF DESCRIPTION OF THE DRAWINGS

The accompanying drawings, which are incorporated in and constitute a part of this specification, illustrate by way of example only an implementation of the invention and, together with the description, serve to explain the advantages and principles of the invention. In the drawings.

DETAILED DESCRIPTION OF THE PREFERRED EMBODIMENTS

Figure 1:
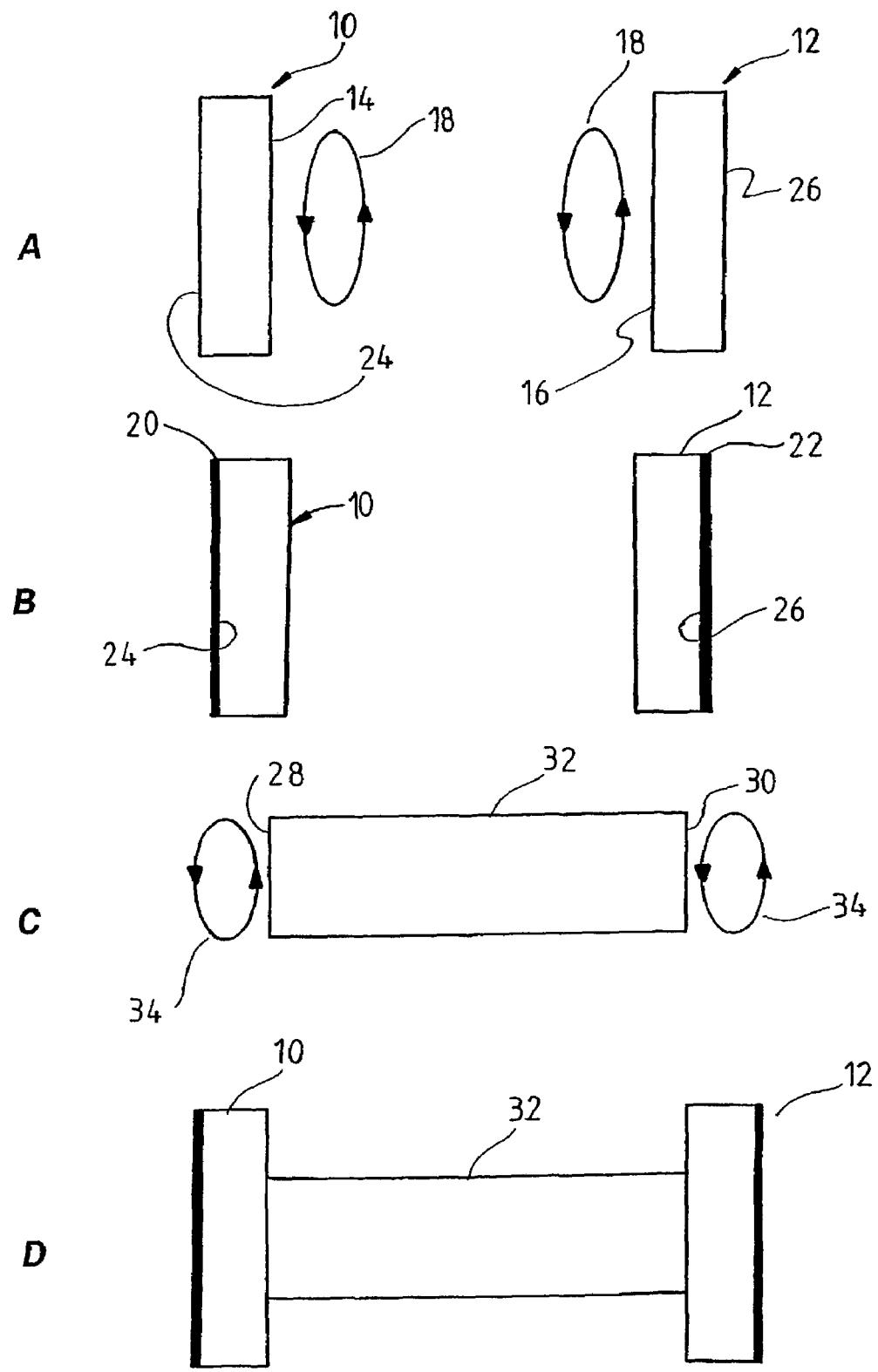
FIGS. 1A to D show schematic drawings illustrating a method of constructing an OPO embodying the present invention.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

The present invention is based on the recognition that optical or surface contacting can be utilised in the construction of OPOs.

Although it is known that optical contacting of the glass directly onto the crystal overcomes the problems of alignment, it has been commonly thought by those skilled in the art that optical contacting of high non-linear coefficient of refractive index crystals and optical glass so as to maintain a high laser damage threshold is not achievable. To achieve optical contacting between such materials requires each to have a satisfactory surface form, finish, cleanliness and surface chemistry and it has been thought that any manipulation of the glass and the crystal surfaces degrades them to such a degree that the laser damage threshold would be too low.

If contacting is to be attempted, it is desirable to match the refractive index of the optical glass components to that of the crystal so as to minimise any Fresnel reflection at their interface. Hence the only suitable components are those that have a high refractive index matching to that of the OPO crystal. The laser damage resistance of high refractive index glass types is generally much lower than that of low refractive index glass types.

Whilst a freshly cleaved crystal plane on an OPO crystal provides for the highest laser damage threshold, any subsequent manipulation of the crystal surface plane leads to a lowering of the laser damage threshold to a point where the OPO could become unusable in its application.

We have however discovered that optical or surface contacting of high refractive index glasses with OPO crystals, i.e. two dissimilar optical materials, whilst maintaining a high laser damage threshold is achievable by an OPO prepared as described below.

Surface contacting provides a means by which the mirrors of the OPO may be fixed in correct alignment to the OPO crystal with a single optical interface between the mirror substrate and the crystal. Such an interface has the appropriate transmission and reflection properties needed for OPO operation. It has been discovered that such an interface also has a sufficiently high laser damage threshold for OPO operation.

In the following, a preferred embodiment of the present invention will be described for the construction of an OPO incorporating a KTP crystal and coated SF 11 glass mirrors. It is however to be understood that the present invention may equally well be used for the optical contacting of other crystals and coated glass mirrors.

Both KTP and the SF 11 glass are relatively soft materials, which damage easily and whose surface form (as defined below) is hard to maintain when polishing. Both are prone to chemical attack from prolonged exposure to the atmosphere that 'deactivates' the surface preventing physical contacting. Where a chemically attacked surface is encountered, the material itself is altered and has to be removed/cleared away by polishing. (Staining is evidence of a chemically altered layer on the surface of the glass).

The majority of the KTP crystals received for construction of embodiments of the present invention therefore required polishing lightly to 'activate' the surface. An alkaline colloidal silica polish was used for this material. It was found that neutral, acidic or slightly acidic polishes were unsuitable, and leaving the surface in a chemical state that induces repulsion between the crystal surface and that of the optical glass.

As mentioned above, each of the surfaces has to be prepared to achieve the correct form, finish, cleanliness and surface chemistry.

Initially, the KTP has to be polished only lightly so as to activate the surface whilst retaining the required surface form. Typically a surface form deviation from plane less than $\lambda/10$ (surface shape or flatness) is required, $\lambda$ typically being 0.6328 microns, the test wavelength of laser light with which the surface form is measured. Too little and the surface will not contact, too much and the surface would not be flat enough to contact with the optical glass surface or will be scratched beyond the surface quality specification. The latter can result in an unacceptably low laser damage threshold.

The SF 11 windows require a similar light polishing with a chemically neutral glass polish to 'activate' their contact surfaces.

The diameter to thickness aspect ratio of the mirror carriers (also referred to as windows) was found to be preferably less than 4:1 to reduce the likelihood of their surfaces being distorted by their subsequent reflective coatings outside of the $\lambda/10$ surface tolerance.

It is to be understood that the mirrors or the reflectors are typically thin films deposited onto the mirror carriers (windows).

FIG. 1 summarises the above-described process. Firstly as illustrated in FIG. 1A two optical glass components, namely SF 11 windows 10 and 12, which had previously been cut, ground, and polished, have their inner surfaces 14 and 16 respectively (those surfaces which will contact a crystal surface), lightly polished 18 with a neutral glass polish. Mirror coatings 20, 22 are then deposited (shown in FIG. 1B) onto the outside surfaces 24 and 26 of the windows 10, 12 respectively. The end faces 28, 30 of a KTP crystal 32 are lightly polished 34 using a colloidal silica polish (FIG. 1C).

The KTP crystal 32 and SF 11 windows 10, 12 are brought together to establish the optical contacting between them (shown in FIG. 1D). Generally the surfaces are wringed together to establish the optical contact. Typically the wringing includes applying simultaneously pressure and rotational or linear relative motion between the surfaces.

From the above description of the preferred embodiment, it can be extracted that the success of the method will therefore likely depend, in part, upon the existence of polishing compounds and methods for the KTP crystal and the high index optical glass that would preferably each simultaneously meet four requirements:

a) Produce surface chemistry that induces attraction between the surfaces to be contacted. This is not automatically guaranteed, as some polishing compounds are known to produce repulsion between extremely clean surfaces.

b) Produce a surface of a finish having a sufficiently high laser damage threshold. Surface finish relates to how well the surface is polished. Typically it relates to the number and type of scratches or pits (digs) in the surface.

c) Produce a surface of a degree of cleanliness having a sufficiently high laser damage threshold. Typically one wants to remove dirt and residue polishing compounds and contamination by foreign matter.

d) Meet the preceding requirements with the minimum of polishing, to maintain a surface form or flatness figure better than $\lambda/10$. This is usually the first step undertaken where the general cross-sectional form of the two surfaces has to be within a set tolerance simply to enable the two surfaces to have at least the minimum degree of contact to assure adhesion of the two surfaces through the cleanliness and chemistry whilst maintaining an acceptable laser damage threshold which in part depends upon the cleanliness and surface finish.

Additionally, it was found that preferably the cumulative parallelism error of the end mirror carriers 10, 12 and crystal 32 be less than 20 arc seconds.

It is to be understood that if the surfaces of the crystal and the window were to satisfy b), c) and d) above, it might still be necessary to very lightly polish the surface as to chemically alter the surface only.

For example, even in the case where the crystal surface is a perfectly cleaved crystal plane, exposure to air will after some time chemically alter the surface making it necessary to be polished. We have however discovered that contrary to common belief, polishing of the crystal does not greatly reduce the laser damage threshold to a point where it is unusable. In fact, we have discovered that polishing lightly can maintain an acceptable laser damage threshold, whilst producing the surface chemistries of the crystal and the optical glass that will induce optical contacting.

We have further discovered that only particular types of polishing compounds produce the desirable effect and that the more commonly used polishing compounds such as:

Cerium Oxide in a neutral water based solution,
Aluminium Oxide in a neutral water based solution,
Aluminium Oxide in a Ethylene Glycol/water based mixture, do not induce attraction when applied to the KTP crystal surface.

We have however discovered that polishing compounds that are mechanically abrasive and induce a chemical action when polishing the KTP result in a surface chemistry that induces attraction between the KTP crystal surface and that of the optical glass. These compounds generally include some acidic or alkaline liquid that is combined with abrasive particulates. The person skilled in the art will appreciate that if b), c) and d) above were satisfied, then the compound used on the crystal surface may not even need to have any abrasive properties.

Hitherto, acidic or alkaline solutions used on high refractive glass have been found to stain it and it was therefore assumed that they could not be used on KTP crystal. It has been a discovery that use of an alkaline polishing compound did not render the KTP crystal unusable in an OPO and in fact left the surface chemistry in such a state so as to induce an attraction between the KTP crystal surface and the surface of a high refractive index glass substrate.

It has been further discovered that use of an acidic polishing compound on the KTP crystal produced a repulsive action between the KTP crystal surface and the surface of a high refractive index glass substrate.

One of the polishing compounds found to specifically provide for optical contacting when used on the KTP crystal was colloidal alkaline silica solution. The SF 11 glass was polished using the more commonly used cerium oxide neutral water based compound.

Figure 2:
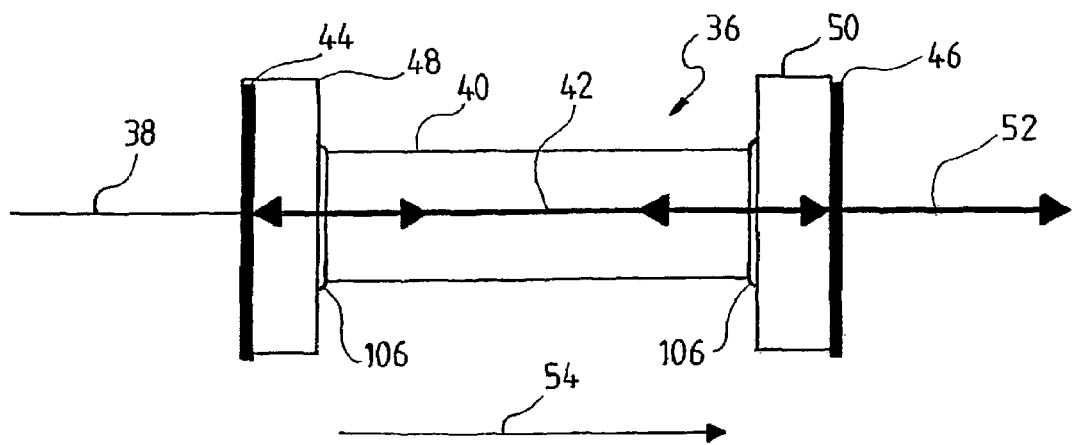
FIG. 2 is a schematic drawing illustrating the operation of an OPO embodying the present invention.

Turning now to FIG. 2, there is illustrated the operation of an OPO 36 constructed in accordance with the above described method.

A pump laser beam 38 is converted within the KTP crystal 40 of the OPO 20 into a wavelength shifted laser beam 42, which resonates within the KTP crystal 40 between two mirrors 44, 46, which are coated onto windows 48, 50 respectively. Partial transmission through one of the mirrors 46 coated onto window 50 results in the wavelength shifted output signal 52 of the OPO 36. The laser beam 38 enters the crystal 40 parallel to the optical axis 54.

Figure 3:
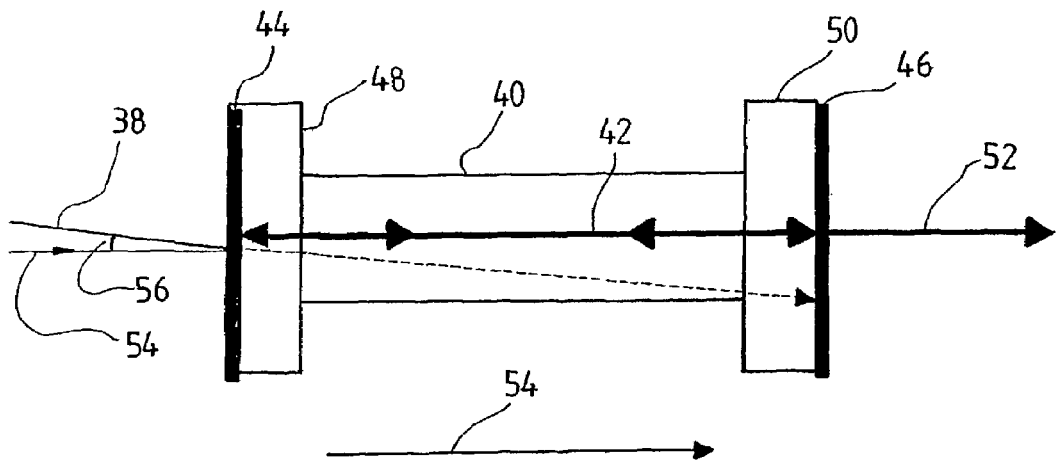
FIG. 3 is a schematic drawing illustrating the operation of an OPO embodying the present invention.

In an alternative configuration shown in FIG. 3, the pump beam 38 may enter the crystal 40 at an angle θ 56 with respect to the optical axis 54. However, since the mirrors 44, 46 are generally orthogonal to the optical axis 54, the resonant wavelength shifted beam 42 and output signal 52 will be generally parallel to the optical axis 52.

It is understood that with crystals such as the KTP the laser pumping efficiency and thus output power are not greatly reduced if the angle θ 56 is even as high as 10 degrees. The importance of this is that at times it is desirous to angularly rotate the OPO to the laser beam, for example, to avoid pump laser retro-reflection and also to align the output beam of the OPO. Those skilled in the art will appreciate that one of the advantageous of the present construction is that once the coated windows are in contact with the crystal no further relative alignment between either the windows or the windows and the crystal is necessary. It is then possible to angularly rotate the OPO as a whole with respect to the laser beam without having to worry about these alignments.

Thus the OPO according to the present invention is more robust than a discrete OPO as defined above and presents a significant advantage over the prior art. It retains the advantages of the monolithic construction without the disadvantages of either the monolithic or discrete constructions.

Figure 4:
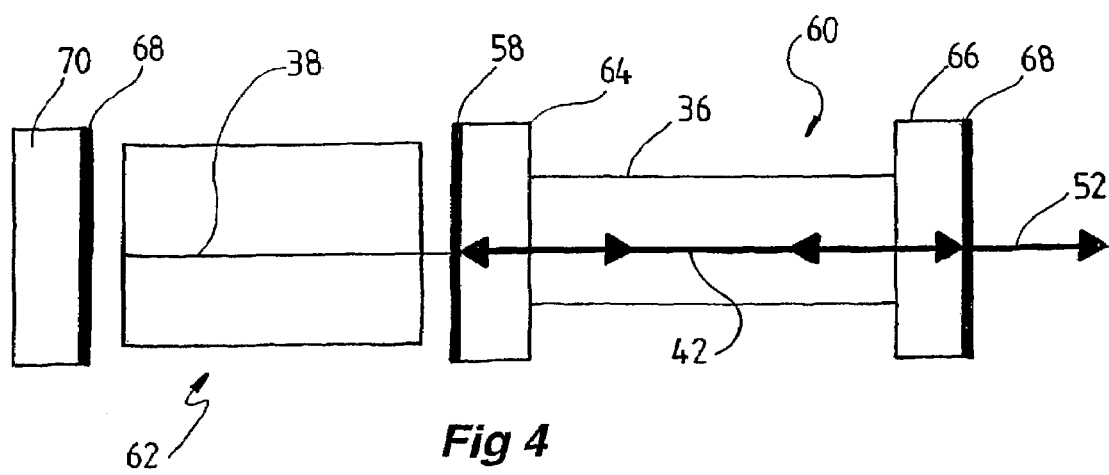
FIG. 4 is a schematic drawing of an alternative OPO design embodying the present invention.

It is also to be understood that the OPO constructed as per the present invention is suitable for use in other types of optical configurations. For example, as illustrated in FIG. 4, in an alternative embodiment, one of the mirrors 58 of an OPO 60 also acts as the output mirror of a pump laser 62.

Again, the KTP crystal 64 of the OPO 60 is optically contacted to windows 64, 66 of the OPO 32, window 66 having a coated mirror 68. The pump laser also includes a highly reflecting mirror 68 on substrate 70.

Figure 5:
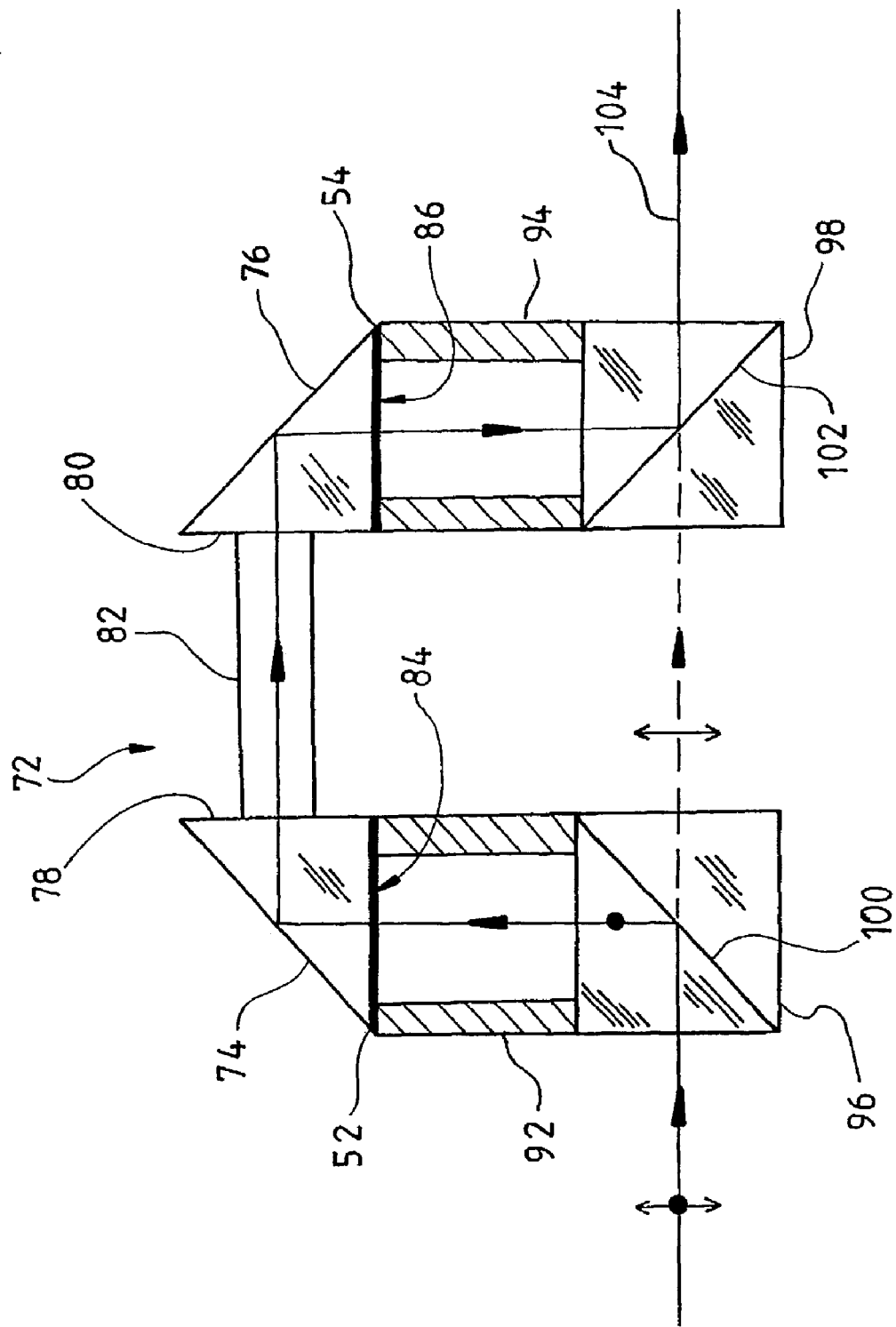
FIG. 5 is a schematic drawing of an alternative OPO design embodying the present invention.

In another embodiment illustrated in FIG. 5, an OPO 72 includes two windows in the form of reflection prisms 74, 76. One side 78, 80 of each prism 74, 76 is optically contacted to the crystal 82, with the other side faces 84, 86 having the mirrors 88, 90 of the OPO 72 coated thereon.

Hollow spacers 92, 94 interconnect the prisms 74, 76 with further optical elements 96, 98. In this embodiment, the optical elements 96, 98 are polarising beam-splitters comprising polarisation dependent mirrors 100, 102. With the configuration of FIG. 5, an output beam 104 of shifted or un-shifted wavelength can be selected by a rotation of the linear polarisation of the incident laser pump radiation into, respectively, the "s" or "p" orientations to the plane of incidence at 100.

It will be appreciated by those skilled in the art that the constructions shown in FIGS. 2 to 5 provide a compact eye-safe laser arrangement with "fixed" alignment. This enables reliable operation through a wide range of environmental conditions.

It will be further appreciated by those skilled in the art that under environmental conditions a crystal surface contacted to the surface of a high refractive index glass substrate may become detached. Generally they may detach at extreme environmental conditions, such as high temperatures and severe mechanical vibration and shock, which are sometimes applied when one in fact wishes to separate surfaces. However, in certain applications where the OPO may be subjected to extreme operational environmental conditions, such as temperatures, pressures and vibrations, the contacted surface may undesirably detach.

Accordingly, it may be advantageous to mechanically stabilise or reinforce the relative position of the crystal surface and the surface of a high refractive index glass substrate when they are in a contact-bonded configuration. Typically, such reinforcement occurs at a region that does not interfere with the normal operation of the OPO, such as the perimeter region 106 defining the outer edge of the crystal surface (illustrated in FIG. 2). This perimeter may even act as a seal to assist in preventing any unwanted contaminant matter from entering the region between the crystal and the glass surfaces.

Typically the reinforcement may be achieved through conventional means such as bonding glue. Alternatively it may even be a mechanical fixing means such as clamps, these suggested by way of example only.

It will be appreciated that in the construction shown in FIG. 4, the pump laser may alternatively be a separate structure i.e. without a mirror shared between the pump laser 62 and the OPO 60. In such an embodiment, alignment requirements would still be reduced when compared with prior art constructions that would use a discrete construction design also for the OPO, resulting in two sets of alignment conditions that need to be maintained during operation.

It will be appreciated by those skilled in the art that it is not intended to limit the present invention to the construction order as described in the embodiments above. For example, the mirrors may be coated onto the windows prior to latter being polished and being optically contacted. In fact this may be preferred.

The invention is not intended to limit the application to different laser types and it is envisaged that various laser configurations may be used with the present invention.

It would be appreciated by a person skilled in the art that numerous variations and/or modifications may be made to the present invention as shown in the specific embodiment without departing from the spirit of scope of the invention as broadly described. The present embodiment is therefore to be considered in all respects to be illustrative and not restrictive.

In the claims that follow and in the summary of the invention, except where the context requires otherwise due to express language or necessary implication, the word "comprising" is used in the same sense of "including", i.e. the features specified may be associated with further features in various embodiments of the invention.

What is claimed is:

1. An optical parametric oscillator, comprising:
   at least one non-linear optical crystal;
   a first optical glass substrate having an inner and outer surface;
   a first mirror arranged on said outer surface of said first optical glass substrate; and
   a surface contact bond between said optical crystal and at least a portion of said first optical glass substrate inner surface, wherein said contact bond provides a high laser damage threshold of said optical crystal.

2. The optical parametric oscillator of claim 1, wherein said parametric oscillator includes:
   a second optical glass substrate having an inner and an outer surface;
   a second mirror arranged on said outer surface of said second optical glass substrate; and
   a surface contact bond between said optical crystal and at least a portion of said second optical glass substrate inner surface.

3. The optical parametric oscillator of claim 2, wherein said optical crystal includes first and second substantially parallel faces with said first optical glass substrate being contacted bonded to said first crystal face and said second optical glass substrate being contact bonded to said second crystal face.

4. The optical parametric oscillator of claim 1, wherein said optical crystal comprises a non-linear coefficient of refractive index type crystal.

5. The optical parametric oscillator of claim 1, wherein said optical crystal is selected from the group consisting of Potassium Titanyl Phosphate (KTP) and Potassium Titanyl Arsenate (KTA).

6. The optical parametric oscillator of claim 1, wherein said first optical glass substrate comprises high refractive index glass.

7. The optical parametric oscillator of claim 1, wherein said first optical glass substrate comprises SF 11 glass.

8. The optical parametric oscillator of claim 2, wherein at least one of said first and second optical glass substrates includes an internal polarising film.

9. The optical parametric oscillator of claim 2, wherein at least one of said first and second optical glass substrates comprises a reflection prism.

10. The optical parametric oscillator of claim 2, wherein said second optical glass substrate comprises high refractive index glass.

11. The optical parametric oscillator of claim 2, wherein said second optical glass substrate comprises SF 11 glass.

12. A method of constructing an optical parametric oscillator (OPO), the method including the steps of:

providing at least one optical crystal, said optical crystal having first and second end faces;

providing at least first and second optical glass components, said first optical glass component having a first inside surface and a first outside surface, said second optical glass component having a second inside surface and a second outside surface;

providing a first mirror on said first outside surface of said first optical glass component;

providing a second mirror on said second outside surface of said second optical glass component;

optically contacting said first inside surface of said first optical glass component onto said first end face of said optical crystal; and optically contacting said second inside surface of said second optical glass component onto said second end face of said optical crystal; wherein the steps of optically contacting said first optical glass component and said second optical glass component onto said optical crystal form surface contact bonds that provide a high laser damage threshold of said optical crystal.

13. The method of claim 12, wherein the steps of optically contacting said first and second optical glass components onto said optical crystal includes the step of removing contamination from said contacting surfaces of said first and second optical glass components and said optical crystal.

14. The method of claim 13, wherein said contamination removal step includes the step of polishing said contacting surfaces of said first and second optical glass components and said optical crystal in a manner that does not substantially adversely effect the quality and surface chemistries of said contacting surfaces.

15. The method of claim 14, wherein said polishing step includes the step of lightly polishing said contacting surfaces of said first and second optical glass components and said optical crystal using a polishing compound and a pad, and wherein said contamination removal step further includes the step of cleaning said contacting surfaces to remove any residual amounts of said polishing compound.

16. The method of claim 13, wherein said contamination removal step includes removal of at least one surface layer from said contacting surfaces of said first and second optical glass components and said optical crystal.

17. The method of claim 14, wherein said polishing step includes using a polishing compound.

18. The method of claim 17, wherein said polishing compound used to polish said first and second end faces of said optical crystal comprises an alkaline type polishing compound.

19. The method of claim 18, wherein said alkaline polishing compound comprises an alkaline colloidal silica polish.

20. The method of claim 17, wherein said polishing compound used to polish said contacting surfaces of said first and second optical glass components comprises a neutral glass polish.

21. An optical parametric oscillator, comprising:
at least one non-linear optical crystal, said optical crystal selected from the group consisting of Potassium Titanyl Phosphate and Potassium Titanyl Arsenate;
a first optical glass substrate having an inner and outer surface;
a first mirror arranged on said outer surface of said first optical glass substrate; and
said first optical glass substrate inner surface being contact bonded to said optical crystal across at least a portion of said first optical glass substrate inner surface, wherein said contact bond provides a high laser damage threshold of said optical crystal.

22. The optical parametric oscillator of claim 21, wherein said parametric oscillator includes a second optical glass substrate having an inner and an outer surface, a second mirror arranged on said outer surface of said second optical glass substrate, and a surface contact bond between said optical crystal and at least a portion of said second optical glass substrate inner surface.

* * * * *